(12) United States Patent
Mukherjee

(10) Patent No.: US 8,594,113 B2
(45) Date of Patent: *Nov. 26, 2013

(54) TRANSMIT-SIDE SCALER AND METHOD FOR PROCESSING OUTGOING INFORMATION PACKETS USING THREAD-BASED QUEUES

(75) Inventor: Shrijeet Mukherjee, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,796

(22) Filed: Apr. 27, 2012

(65) Prior Publication Data

US 2012/0207176 A1 Aug. 16, 2012

Related U.S. Application Data

(63) Continuation of application No. 11/945,917, filed on Nov. 27, 2007, now Pat. No. 8,170,042.

(51) Int. Cl.
*H04L 12/28* (2006.01)

(52) U.S. Cl.
USPC ........... 370/417; 370/352; 370/412; 370/471; 711/133; 711/163; 711/206; 718/102; 718/105

(58) Field of Classification Search
USPC .......... 370/352, 412, 471; 711/133, 163, 206, 711/E11.09
See application file for complete search history.

(56) References Cited

U.S. PATENT DOCUMENTS

| 6,560,629 | B1 * | 5/2003 | Harris ........................... 718/105 |
| 7,228,550 | B1 * | 6/2007 | Eberhard et al. .............. 719/312 |
| 7,240,350 | B1 | 7/2007 | Eberhard et al. |
| 7,369,954 | B2 | 5/2008 | Levine et al. |
| 8,170,042 | B2 | 5/2012 | Mukherjee |
| 2001/0043610 | A1 | 11/2001 | Nemirovsky et al. |
| 2002/0133738 | A1 | 9/2002 | Zeigler et al. |
| 2005/0100000 | A1 | 5/2005 | Faulkner et al. |
| 2005/0210454 | A1 | 9/2005 | DeWitt, Jr. et al. |
| 2007/0101332 | A1 * | 5/2007 | Courchesne et al. ......... 718/102 |
| 2007/0283115 | A1 * | 12/2007 | Freeman et al. .............. 711/163 |
| 2008/0253387 | A1 | 10/2008 | Liang et al. |
| 2009/0135844 | A1 | 5/2009 | Mukherjee |

FOREIGN PATENT DOCUMENTS

WO   WO-2010117359 A1   10/2010

OTHER PUBLICATIONS

U.S. Appl. No. 11/945,917 , Response filed Sep. 21, 2011 to Non Final Office Action mailed Jun. 23, 2011, 11 pgs.

U.S. Appl. No. 11/945,917, Non-Final Office Action mailed Aug. 19, 2010, 28 pgs.

(Continued)

*Primary Examiner* — Andrew Chriss
*Assistant Examiner* — Mohamed Kamara
(74) *Attorney, Agent, or Firm* — Schwegman Lundberg & Woessner, P.A.

(57) ABSTRACT

Embodiments of a transmit-side scaler and method for processing outgoing information packets using thread-based queues are generally described herein. Other embodiments may be described and claimed. In some embodiments, a process ID stored in a token area may be compared with a process ID of an application that generated an outgoing information packet to obtain a transmit queue. The token area may be updated with a process ID stored in an active threads table when the process ID stored in the token area does not match the process ID of the application.

19 Claims, 3 Drawing Sheets

(56) References Cited

OTHER PUBLICATIONS

U.S. Appl. No. 11/945,917, Non Final Office Action mailed Jan. 5, 2011, 21 pgs.
U.S. Appl. No. 11/945,917, Non Final Office Action mailed Jun. 23, 2011, 25 pgs.
U.S. Appl. No. 11/945,917, Notice of Allowance mailed Jan. 3, 2012, 19 pgs.
U.S. Appl. No. 11/945,917, Response filed Apr. 5, 2011 to Non Final Office Action mailed Jan. 5, 2011, 12 pgs.
International Application Serial No. PCT/US2009/039786, International Preliminary Report on Patentability mailed Oct. 20, 2011, 9 pgs.
International Application Serial No. PCT/US2009/039786, Search Report mailed Jun. 9, 2009, 4 pgs.
International Application Serial No. PCT/US2009/039786, Written Opinion mailed Jun. 9, 2009, 9 pgs.

* cited by examiner

TRANSMIT-SIDE SCALER AND METHOD FOR PROCESSING OUTGOING INFORMATION PACKETS USING THREAD-BASED QUEUES

CLAIM OF PRIORITY

This application is a continuation of and claims the benefit of priority under 35 U.S.C. §120 to U.S. patent application Ser. No. 11/945,917, filed on Nov. 27, 2007, which is hereby incorporated by reference herein in its entirety.

TECHNICAL FIELD

Some embodiments pertain to transmit-side processing in connection-oriented systems and virtualization platforms. Some embodiments pertain to network protocol processing, such as TCP/IP processing, prior to transmission.

BACKGROUND

In connection oriented systems, the scheduling and queuing of outgoing network packets presents several challenges. For example, outgoing packets of one flow may be held up by outgoing packets of another flow. Unlike receive-side processing, in transmit side processing the flow associated with an outgoing network packet is not readily identifiable by the packet. Operating systems typically insert a packet header that identifies the flow information just before network transmission. To retain the order of the packets of a flow prior to network transmission, some operating systems multiplex outgoing network packets of several flows together into a single output queue. As a result, slower flows may slow unrelated faster flows.

Thus, there are general needs for processing outgoing information packets that improve throughput in server systems, and maintain packet order in outgoing flows.

OVERVIEW

Some example embodiments are directed to a transmit-side scaler. The transmit-side scaler may include a token area memory to store a plurality of token areas. Each token area may be associated with a user application. The transmit-side scaler may also include a transmit queue memory to provide a plurality of transmit queues, and memory to store an active threads table that associates process identifiers (IDs) of active threads with one of the transmit queues. The transmit-side scaler may include processing circuitry configured to identify one of the transmit queues for an outgoing information packet by comparing a process ID stored in the token area associated with the application generating the packet with a process ID of the user application that generated the outgoing information packet.

Some other example embodiments are directed to methods for processing outgoing information packets. The methods include identifying a transmit queue for an outgoing information packet from a token area associated with the user application providing the outgoing information packet when a process ID stored in the token area matches a process ID of the user application. The transmit queue for the outgoing information packet may be identified from an active threads table when the process ID stored in the token area does not match the process ID of the user application. A new transmit queue may be generated when the process ID of the user application is not identified in the active threads table.

DESCRIPTION OF EXAMPLE EMBODIMENTS

The following description and the drawings sufficiently illustrate specific embodiments to enable those skilled in the art to practice them. Other embodiments may incorporate structural, logical, electrical, process, and other changes. Examples merely possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
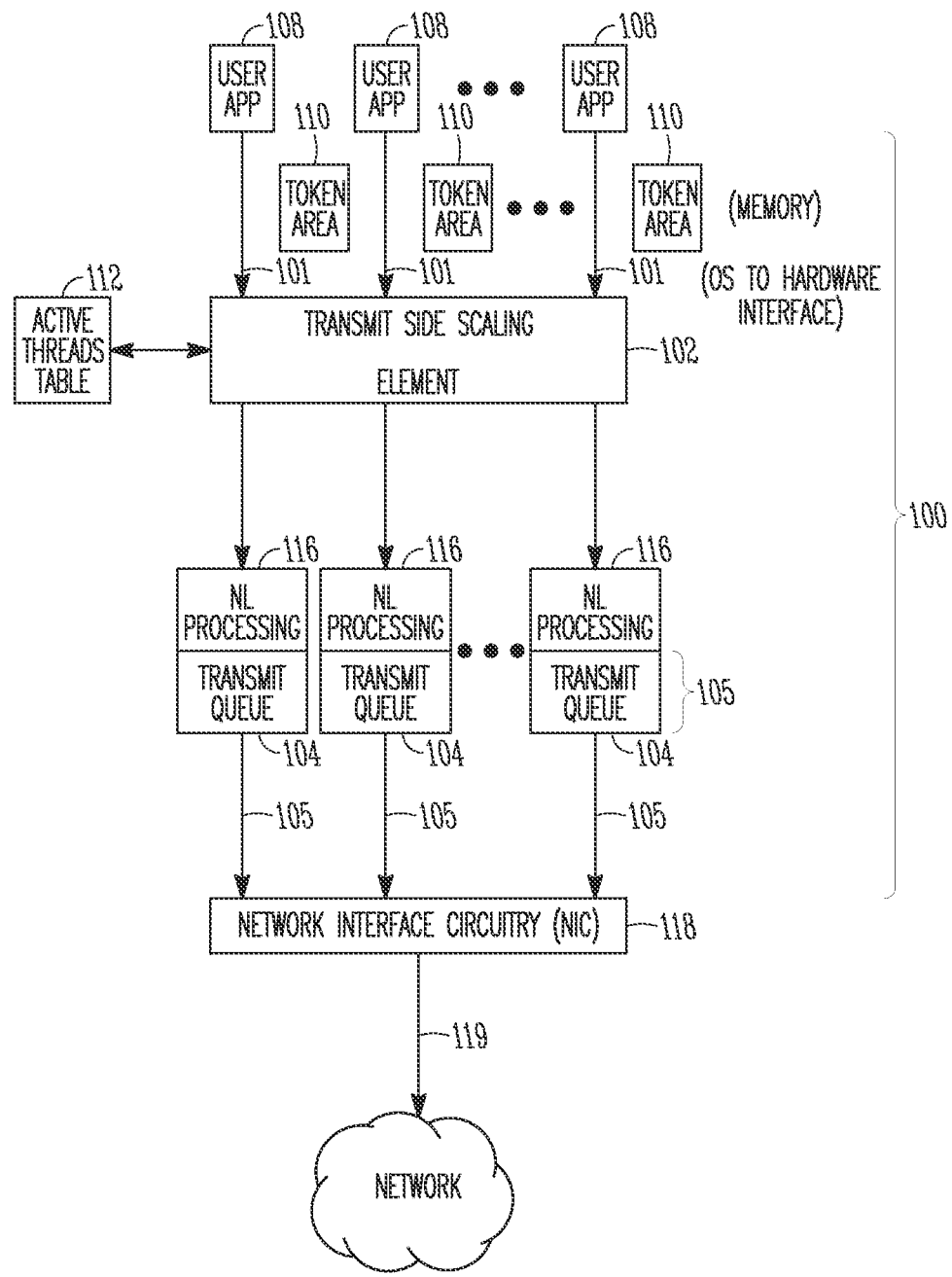
FIG. 1 is a block diagram of a transmit-side scaler in accordance with some embodiments.

FIG. 1 is a block diagram of a transmit-side sealer 100 in accordance with some embodiments. Transmit-side scaler 100 performs transmit-side processing which refers to the processing of outgoing information packets 101 received from user applications 108 for subsequent transmission as network packets over a network connection 119. Transmit-side scaler 100 may be used to process outgoing information packets 101 received from user applications 108 for transmission by network interface circuitry 118 over network connection 119 to an external network. Transmit-side scaler 100 may include a plurality of transmit queues 104 which may be established for each active processing thread. Transmit-side scaler 100 may also include network layer (NL) processing elements 116, which may be associated with each transmit queue 104. Network layer processing elements 116 which generate network-layer packets from information packets 101. Transmit-side scaler 100 may also include token areas 110 which may be associated with each user application 108. Transmit-side scaler 100 may also include active threads table 112 to associate process identifiers (IDs) of active processing threads of user applications 108 with particular transmit queues 104. Transmit-side scaler 100 may also include transmit-side scaling element 102 configured to process outgoing information packets 101 and perform various operations as described in more detail below.

Transmit queues 104, active threads table 112, and token areas 110 may comprise portions of memory. Transmit queues 104 may be stored in transmit-queue memories 105. Token areas 110 may be private areas of memory that are reserved on a per connection basis from a user-space socket. These private token areas 110 may be managed, created, and eliminated by the operating system. Token areas 110 may store a current process ID, and, as discussed in more detail below, may be updated when an application transmitting an outgoing information packet may have a different process ID than the process ID identified in the associated token area.

In accordance with some embodiments, one of the transmit queues 104 may be identified for an outgoing information packet 101 by comparing a process ID stored in the token area 110 associated with the user application 108 generating the packet with the process ID of the user application 108 that generated the outgoing information packet 101. In these embodiments, the proper transmit queue 104 may be obtained directly from the associated token area 110 when the process ID of the user application 108 generating the outgoing information packet matches the process ID stored in the associated token area 110. When the process ID of the user application 108 generating the outgoing information packet does not match the process ID stored in the associated token area (i.e., a miss), the proper transmit queue may not be identified in the associated token area 110 and therefore needs to be determined.

When the process ID stored in the token area 110 does not match the process ID of the user application 108 that generated the outgoing information packet 101, the token area 110 may be updated with a process ID stored in an active threads table 112. In this situation, the current process ID was not stored in the associated token area 110, and therefore the token area 110 may be updated with the current process ID found in the active threads table 112. The associated token area 110 may also be updated to identify the proper transmit queue 104 found in the active threads table.

A processing thread of a new flow may be identified when the process ID of the user application 108 that generated an outgoing information packet 101 does not match the process ID stored in the token area (i.e., resulting in a miss) and when the process ID of the user application 108 that generated the outgoing information packet 101 is not listed in the active threads table 112. Accordingly, transmit queues 104 may be established for each processing thread. This allows IP flows to be uniquely mapped to a transmit queue 104 and either the hardware or the operating system may schedule outgoing packets from multiple transmit queues for transmission. This is unlike conventional systems in which kernel scheduling is needed between multiple IP flows since there may be only one outgoing queue and multiple flows. These embodiments are discussed in more detail below.

Figure 2A:
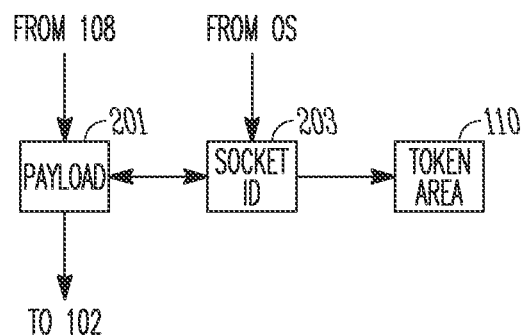
FIG. 2A illustrates the operations related to receipt of an outgoing information packet in accordance with some embodiments.

FIG. 2A illustrates the operations related to receipt of an outgoing information packet in accordance with some embodiments. Payload portion 201 of an outgoing information packet 101 (FIG. 1) may be received from one of user applications 108. The operating system may provide a socket ID 203 corresponding to payload portion 201. The socket ID may be used to locate the interact socket information (e.g., the local IP address, local port, remote port and remote IP address) as well as the task control block (TCB) stored in protective memory of the kernel stack allowing the corresponding process ID to be identified.

Figure 2B:
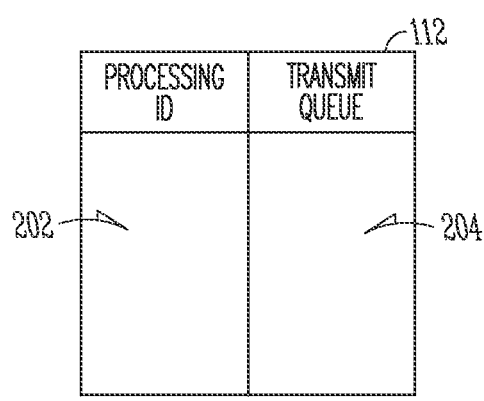
FIG. 2B illustrates the structure of an active threads table in accordance with some embodiments.

FIG. 2B illustrates the structure of an active threads table in accordance with some embodiments. Active threads table 112 comprises process IDs 202 and associated transmit queues 204. Each of associated transmit queues 204 may correspond to one of transmit queues 104 (FIG. 1).

Referring to FIGS. 1, 2A and 2B, in some example embodiments, outgoing information packets 101 may comprise application data received from user applications 108. An outgoing information packet 101 may be associated with a process ID which corresponds to a process running on one of a plurality of processing cores (not separately illustrated in FIG. 1). A user application 108 providing an outgoing information packet may be associated with a token area 110 identifying a process ID and one of the transmit queues 104. In these example embodiments, token areas 110 may comprise private areas in memory for storing token areas. Each processing core (e.g., a CPU) (not separate illustrated) may support more than one user application 108, and an operating system to hardware interface (not separately illustrated) may be provided between the processing cores and transmit side scaling element 102.

In response to receipt of an outgoing information packet 101, transmit side scaling element 102 may compare the process ID of the user application 108 that generated the outgoing information packet 101 with a process ID stored in the associated token area 110. When the process IDs match (i.e., a hit), an active thread has been identified. In this situation, the transmit queue 104 may be identified in the token area and the payload 210 of the outgoing information packet 101 may be sent to the identified transmit queue 104.

When the process IDs do not match (i.e., a miss), transmit side scaling element 102 may determine whether the outgoing information packet 101 is associated with a different processing thread of the same flow, or a processing thread of a new flow. Processing IDs of different processing threads of the same flow, for example, may be identified using active threads table 112. New transmit queues may be generated for processing threads of a new flow.

Network layer (NL) processing circuitry 116 may generate network layer packets (e.g., TCP/IP packets) prior to storing the processed packets in transmit queues 104. Network layer packets 105 from the transmit queues 104 may wait for subsequent processing by the operating system and may be provided to network interface circuitry 118 for transmission over network connection 119. Network interface circuitry 118, may, for example, comprise a network interface card (NIC).

In some example embodiments, network layer processing circuitry 116 may generate TCP/IP packets which may include added header information. In some example embodiments, separate network layer processing circuitry 116 may be associated with each of transmit queues 104 as illustrated.

Although the system illustrated in FIG. 1 may be almost any processing system including a computer system or a server system, in some example embodiments, the system may be a virtualization platform that includes a host system. The host system may include a virtual-machine manager which may help manage virtual machine migration (i.e., the live migration of a virtual machine between physical machines). In these example embodiments, any one or more of user applications 108 may be considered a virtual machine and accordingly the virtual-machine manager may manage the live migration of a running virtual machine between physical machines (i.e., from the host system to another host system). In some example embodiments, the virtual-machine manager may operate as a hypervisor. In some example embodiments, user applications 108 may be viewed as guest applications and may include an instance of a guest operating system. User applications 108 may also include un-privileged user-space applications, although the scope of the disclosure is not limited in this respect.

Figure 3:
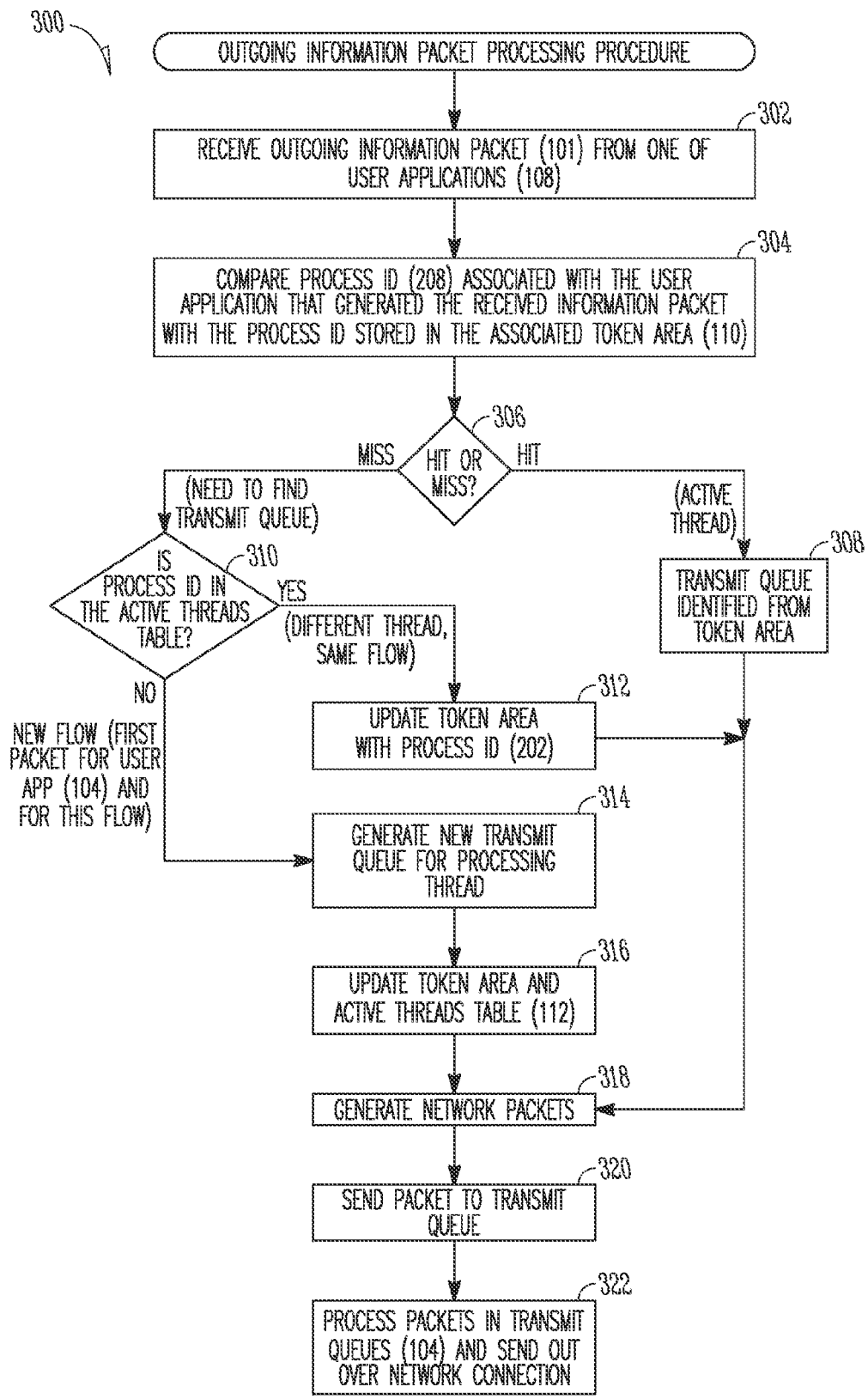
FIG. 3 is a flow chart of an outgoing information packet processing procedure in accordance with some embodiments.

FIG. 3 is a flow chart of an outgoing information packet processing procedure in accordance with some embodiments. Outgoing information packet processing procedure 300 may be performed by transmit-side scaling element 102 (FIG. 1), although other combinations of hardware and software may be configured to perform procedure 300.

Referring to FIGS. 1 and 3 together, in procedure 300, outgoing information packets 101 are received from user applications 108, and the proper transmit queue 104 for the outgoing information packets 101 is either identified or created. The outgoing information packets 101 packets are converted to network layer (e.g., TCP/IP) packets and stored in the proper transmit queue 104 prior to being sent out over network connection 119 by the operating system.

In operation 302, an outgoing information packet 101 is received from one of user applications 108. As discussed above, the process ID associated with the outgoing information packet may identify a process running on one of the processing cores. The process ID associated with the information packet may be the process ID of the user application 108 generating the information packet. Furthermore, from the outgoing information packet 101, the associated token area 110 may be identified. In some embodiments, applications 108 may pass a data buffer (e.g., not the actual outgoing information packet 101) and a socket ID, although the scope of the embodiment is not limited in this respect.

In operation 304, the process ID associated with the outgoing information packet 101 is compared with a process ID stored in the associated token area 110.

Operation 306 determines whether or not the process IDs compared in operation 304 match. When process ID stored in the token area 110 matches the process of the user application 108 generating the outgoing information packet 101, operation 308 is performed in which the proper transmit queue 104 corresponding to the process ID is identified by the token area 110. When the process IDs do not match (i.e., a miss), operation 310 is performed to either determine the proper transmit queue or create a new transmit queue.

Operation 310 determines whether the process ID associated with the outgoing information packet 101 is listed in the active threads table 112. When the process ID associated with the outgoing information packet 101 is listed in the active threads table 112, the information packet is associated with a different thread of the same flow. Operation 312 accordingly updates the associated token area 110 with the process ID from the active threads table and may also associate the proper transmit queue 104 in the associated token area 110.

In operation 310, when the process ID associated with the outgoing information packet 101 is not listed in the active threads table 112, the outgoing information packet 101 may be the first packet for the user application 108 and/or may be associated with a new flow. In these situations, operation 314 generates a new transmit queue 104 for the processing thread corresponding the process ID.

In operation 316, the token area 110 associated with the user application 108 is updated with the process ID and to identify the new transmit queue 104 generated in operation 314. A new entry for the process ID and the new transmit queue 104 may also be added the active threads table 112.

In operation 318, the outgoing information packet may be converted to a network layer packet, such as a TCP/IP packet. Operation 318 may be performed by one of network layer processing elements 116 associated with a transmit queue 104, although the scope of the embodiment is not limited in this respect. In some alternate embodiments, a single network layer processing element may perform network layer packet conversion for all the transmit queues 104.

In operation 320, after conversion to a network layer packet in operation 318, the outgoing information packet is sent to the associated transmit queue 104.

In operation 322, the network layer packets in the transmit queues 104 may wait for subsequent processing by the operating system where they may be transferred by NIC 118 over network connection 119. The transmit queues may be serviced in a variety of orders that may, for example, be based on the quality-of-service (QoS) and/or latency requirements for the particular flow.

Although the individual operations of procedure 300 are illustrated and described as separate operations, one or more of the individual operations may be performed concurrently, and nothing requires that the operations be performed in the order illustrated.

Although the system illustrated in FIG. 1 is illustrated as having several separate functional elements, one or more of the functional elements may be combined and may be implemented by combinations of software-configured elements, such as processing elements including digital signal processors (DSPs), and/or other hardware elements. For example, some functional elements, including for example, transmit side scaling element 102, may comprise one or more microprocessors, DSPs, application specific integrated circuits (ASICs), and combinations of various hardware and logic circuitry for performing at least the functions described herein. In some embodiments, the functional elements of the system may refer to one or more processes operating on one or more processing elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Some embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A transmit-side scaler to process outgoing information packets, the transmit-side scaler comprising:
   token area memory to store a plurality of token areas, each token area associated with a user application;
   a transmit queue memory to provide a plurality of transmit queues;
   memory to store an active threads table that associates process IDs of active processing threads with one of the transmit queues; and
   processing circuitry to identify one of the transmit queues for an outgoing information packet by comparing a process ID of the user application that generated the outgoing information packet with a process ID stored in the token area,
   wherein when the process ID of the user application that generated the outgoing information packet does not match the process ID stored in the token area and is not stored in the active threads table, the processing circuitry:

generates a new transmit queue for an active processing thread associated with the process ID of the user application that generated the outgoing information packet;
updates the token area with the process ID of the user application; and
adds a new entry to the active threads table to identify the process ID of the user application and the new transmit queue.

2. The transmit-side scaler of claim 1 wherein the new transmit queue is generated for processing threads of a new flow when:
the process ID of the user application that generated the outgoing information packet does not match the process ID stored in the token area and is not identified in the active threads table.

3. The transmit-side scaler of claim 1 wherein the outgoing information packet comprises application data received from one of a plurality of user applications, and
wherein the process ID is associated with one of the user applications and corresponds to a process running on one of a plurality of processing cores.

4. The transmit-side scaler of claim 1 wherein when the process ID stored in the token area matches the process ID of the application generating the outgoing information packet, the outgoing information packet is sent to the transmit queue identified in the token area.

5. The transmit-side scaler of claim 1 wherein
wherein when the process ID of the user application that generated the outgoing information packet does not match the process ID stored in the token area, and the process ID of the user application is in the active threads table, the information packet is determined to be associated with a different processing thread of a current flow and the processing circuitry updates the associated token area with the process ID from the active threads table to associate a proper transmit queue.

6. The transmit-side scaler of claim 5 wherein after the token area is updated, the outgoing information packet is sent to the transmit queue identified in the token area.

7. The transmit-side scaler of claim 6 further comprising:
generating network layer packets prior to sending the outgoing information packets to the identified transmit queue,
wherein the network layer packets from the transmit queues wait for subsequent transmission over a network connection.

8. The transmit-side scaler of claim 1 wherein the active threads table identifies one of the transmit queues for each processing thread.

9. A method for processing outgoing information packets, the method comprising:
comparing a process ID of a user application that generated an outgoing information packet with a process ID stored in a token area to obtain a transmit queue;
wherein when the process ID of the user application that generated the outgoing information packet does not match the process ID stored in the token area and is not stored in an active threads table, the method includes:
generating a new transmit queue for a processing thread associated with the process ID of the user application that generated the outgoing information packet;
updating the token area with the process ID of the user application; and
adding a new entry to the active threads table to identify the process ID of the user application and the new transmit queue.

10. The method of claim 9 wherein the new transmit queue is generated for processing threads of a new flow when:
the process ID of the application that generated the outgoing information packet does not match the process ID stored in the token area and is not identified in the active threads table.

11. The method of claim 9 wherein the outgoing information packet comprises application data received from one of a plurality of user applications, and
wherein the process ID associated with one of the user applications corresponds to a process running on one of a plurality of processing cores, and
wherein a token area is associated with each user application.

12. The method of claim 9 wherein when the process ID of the user application that generated the outgoing information packet matches the process ID stored in the token area, the method includes sending the outgoing information packet to the transmit queue identified in the token area.

13. The method of claim 9 wherein when the process ID of the user application that generated the outgoing information packet does not match the process ID stored in the token area, and the process ID of the user application is in the active threads table, the information packet is determined to be associated with a different processing thread of a current flow and the method includes updating the associated token area with the process ID stored in the active threads table to associate a proper transmit queue.

14. The method of claim 13 wherein after the token area is updated, the method comprises sending the outgoing information packet to the transmit queue identified in the token area.

15. The method of claim 14 further comprising:
generating network layer packets prior to sending the packets in the identified transmit queue,
wherein the network layer packets from the transmit queues wait for subsequent transmission over a network connection.

16. The method of claim 9 wherein the active threads table identifies one of a plurality of the transmit queues for each active processing thread.

17. A method of processing outgoing information packets received from a plurality of user applications, the method comprising:
identifying a transmit queue for an outgoing information packet from a token area associated with the user application providing the outgoing information packet when a process ID of the user application matches a process ID stored in the token area;
generating a new transmit queue, when the process ID of the user application does not match the process ID stored in the token area and is not identified in an active threads table,
wherein in response to the generation of the new transmit queue, the method further comprises updating the token area with the process ID of the application, and adding a new entry to the active threads table to identify the process ID of the user application and the new transmit queue.

18. A computer-readable storage device that stores instructions for execution by one or more processors to process outgoing information packets, the instructions causing the one or more processors to:
compare a process ID of a user application that generated an outgoing information packet with a process ID stored in a token area to obtain a transmit queue; and when the process ID of the user application that generated the outgoing information packet does not match the process ID stored in the token area and is not stored in an active threads table, the instructions further cause the one or more processors to:
- generate a new transmit queue for a processing thread associated with the process ID of the user application that generated the outgoing information packet;
- update the token area with the process ID of the user application; and
- add a new entry to the active threads table to identify the process ID of the user application and the new transmit queue.

19. An apparatus to process outgoing information packets, the apparatus comprising:
- means for comparing a process ID of a user application that generated an outgoing information packet with a process ID stored in a token area to obtain a transmit queue;
- means for generating a new transmit queue for a processing thread associated with the process ID of the user application that generated the outgoing information packet, when the process ID of the user application that generated the outgoing information packet does not match the process ID stored in the token area and is not stored in an active threads table;
- means for updating the token area with the process ID of the user application; and means for adding a new entry to the active threads table to identify the process ID of the user application and the new transmit queue.

* * * * *